(12) United States Patent
Rangsten et al.

(10) Patent No.: US 7,207,227 B2
(45) Date of Patent: Apr. 24, 2007

(54) PRESSURE SENSOR

(75) Inventors: Pelle Rangsten, Storvreta (SE); Edvard Kalvesten, Hägersten (SE); Marianne Mechbach, Sollentuna (SE)

(73) Assignee: Silex Microsystems AB, Järfälla (SE)

( * ) Notice: Subject to any disclaimer, the term of this patent is extended or adjusted under 35 U.S.C. 154(b) by 0 days.

(21) Appl. No.: 11/250,548

(22) Filed: Oct. 17, 2005

(65) Prior Publication Data

US 2006/0032039 A1 Feb. 16, 2006

Related U.S. Application Data

(62) Division of application No. 10/492,612, filed as application No. PCT/SE02/01884 on Oct. 15, 2002, now Pat. No. 6,973,835.

(30) Foreign Application Priority Data

Oct. 15, 2001 (SE) .................................. 0103471

(51) Int. Cl.
*G01L 9/16* (2006.01)
(52) U.S. Cl. ...................................... 73/754
(58) Field of Classification Search ................. 73/706, 73/715–728, 754; 257/414, 415, 416, 417, 257/418, 419
See application file for complete search history.

(56) References Cited

U.S. PATENT DOCUMENTS

| | | | |
|---|---|---|---|
| 4,459,855 A * | 7/1984 | Yamagami .................... | 73/727 |
| 4,975,390 A | 12/1990 | Fujii et al. | |
| 5,291,788 A * | 3/1994 | Oohata et al. ................. | 73/727 |
| 5,335,550 A | 8/1994 | Satou | |
| 5,578,843 A | 11/1996 | Garabedian et al. | |
| 5,749,226 A | 5/1998 | Bowman et al. | |
| 6,058,781 A * | 5/2000 | Kusuyama et al. ........... | 73/724 |

(Continued)

OTHER PUBLICATIONS

International Search Report in corresponding International Application No. PCT/SE 02/01884, mailed Jan. 23, 2003.

*Primary Examiner*—Eric S. McCall
(74) *Attorney, Agent, or Firm*—Nixon & Vanderhye P.C.

(57) ABSTRACT

In manufacturing a pressure sensor a recess that will form part of the sensor cavity is formed in a lower silicon substrate. An SOI-wafer having a monocrystalline silicon layer on top of a substrate is bonded to the lower silicon substrate closing the recess and forming the cavity. The supporting substrate of the SOI-wafer is then etched away, the portion of the monocrystalline layer located above the recess forming the sensor diaphragm. The oxide layer of the SOI-wafer here acts as an "ideal" etch stop in the case where the substrate wafer is removed by dry (plasma) or wet etching using e.g. KOH. This is due to high etch selectivity between silicon and oxide for some etch processes and it results in a diaphragm having a very accurately defined and uniform thickness. The cavity is evacuated by forming a opening to the cavity and then sealing the cavity by closing the opening using LPCVD. Sensor paths for sensing the deflection of the diaphragm are applied on the outer or inner surface of the diaphragm. The monocrystalline diphragm gives the sensor a good long-term stability. Also the sensor path can be made of monocrystalline material, this giving the sensor even better good long-term characteristics. An increased sensitivity can be obtained by making active portions of the sensor paths freely extending, unsupported by other material of the pressure sensor, by suitable etching procedures.

24 Claims, 11 Drawing Sheets

U.S. PATENT DOCUMENTS 6,140,144 A    10/2000  Najafi et al.
6,373,115 B1*  4/2002  Kolb et al. ................. 257/414
6,422,088 B1   7/2002  Oba et al.
6,499,354 B1   12/2002 Najafi et al.
6,653,702 B2   11/2003 Ishio et al.

* cited by examiner

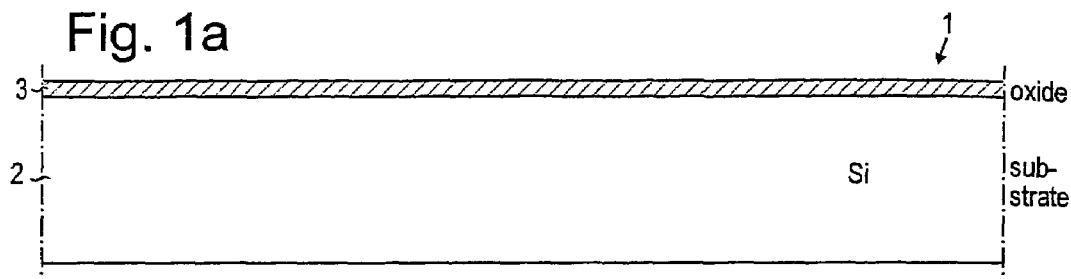
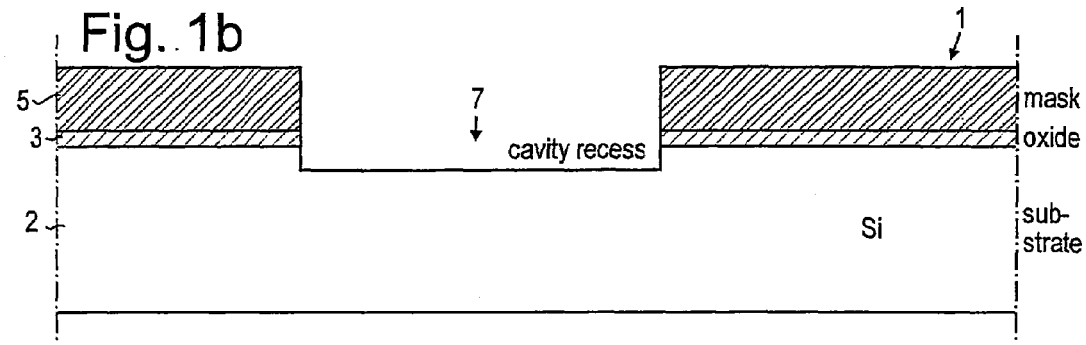
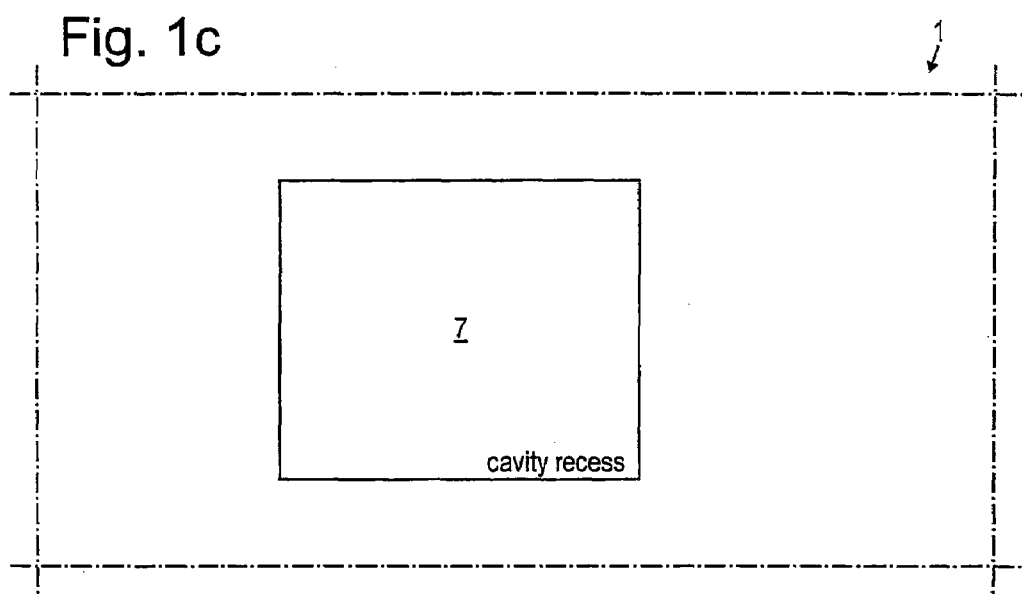
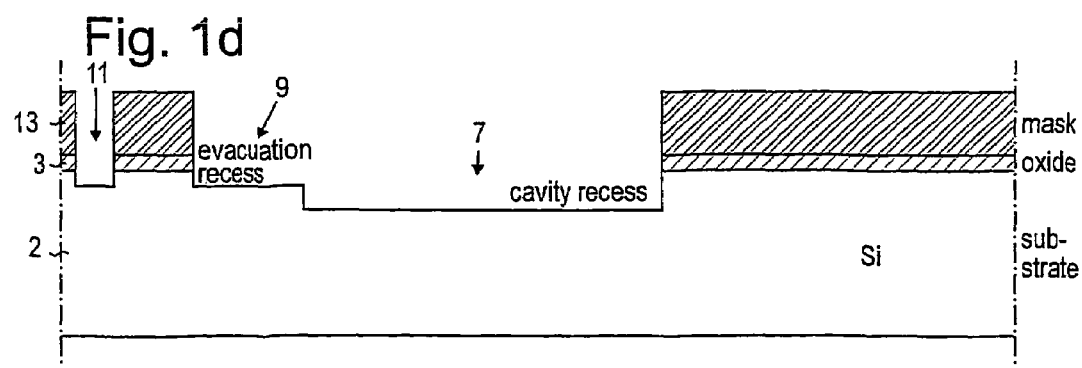

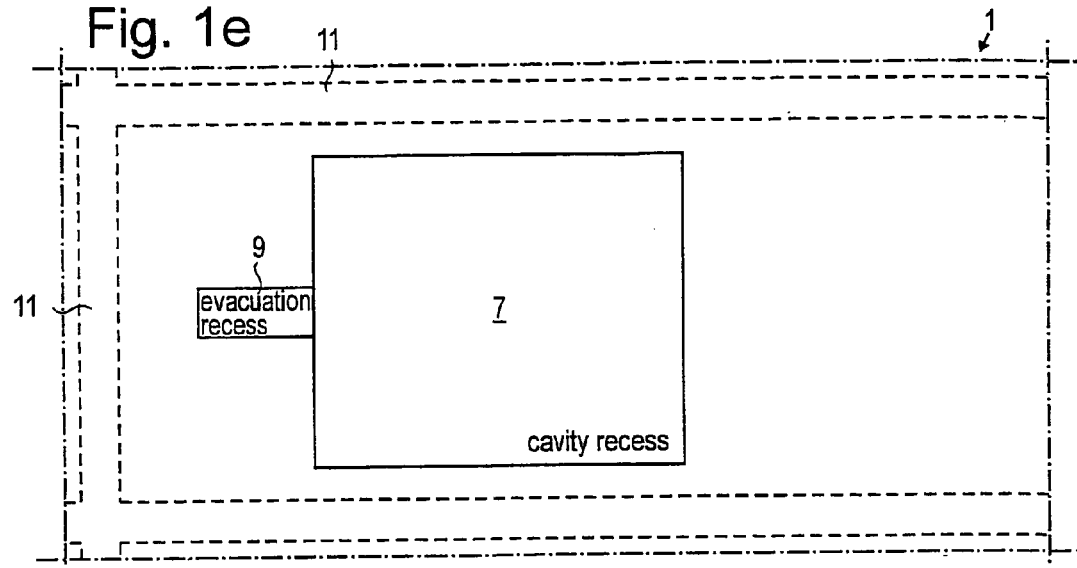
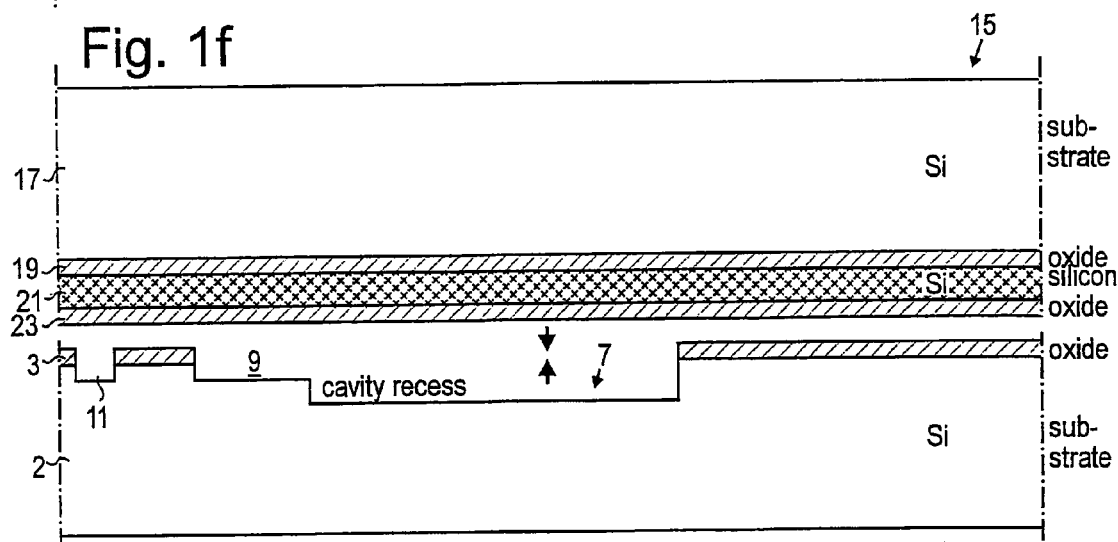
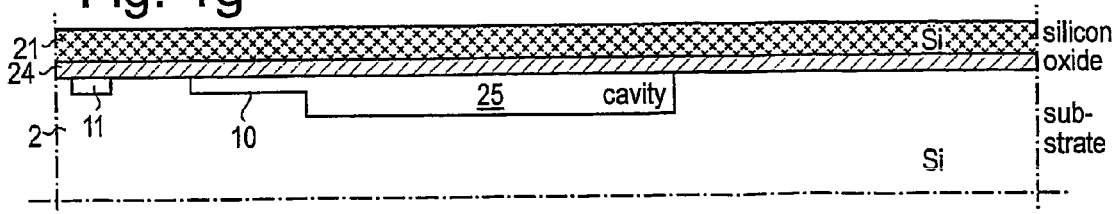
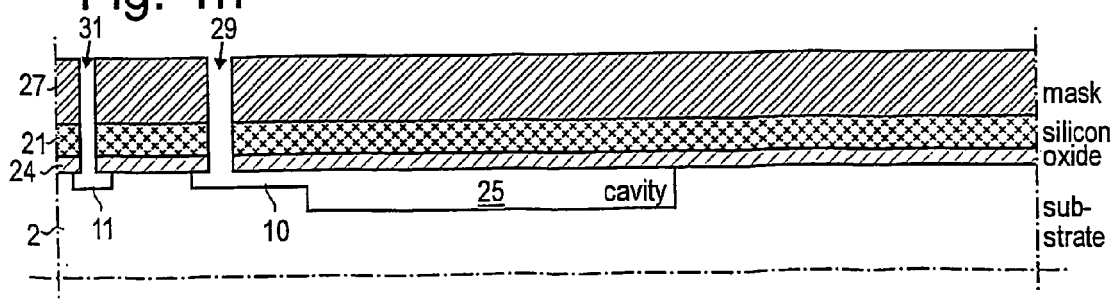

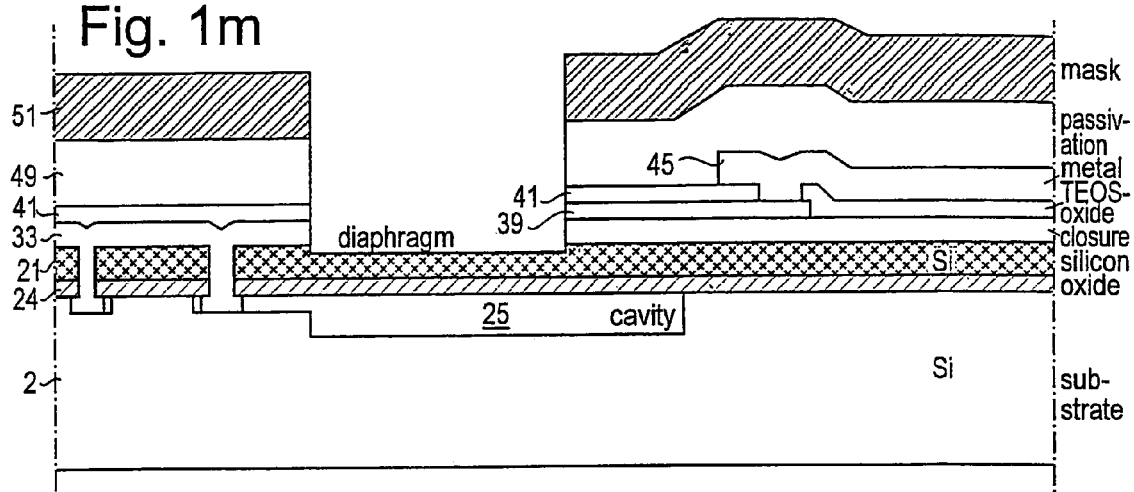
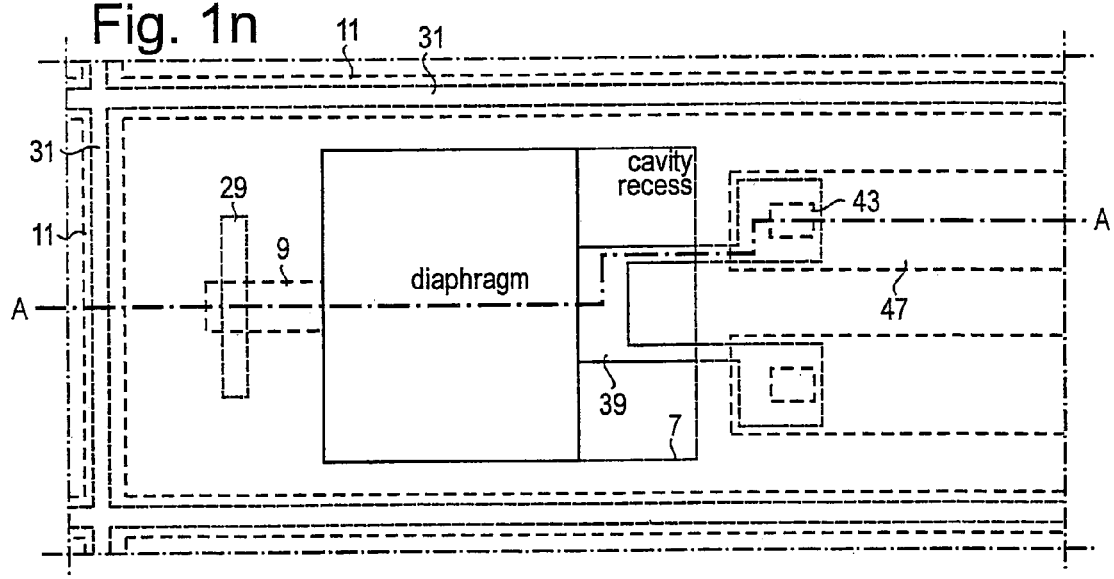

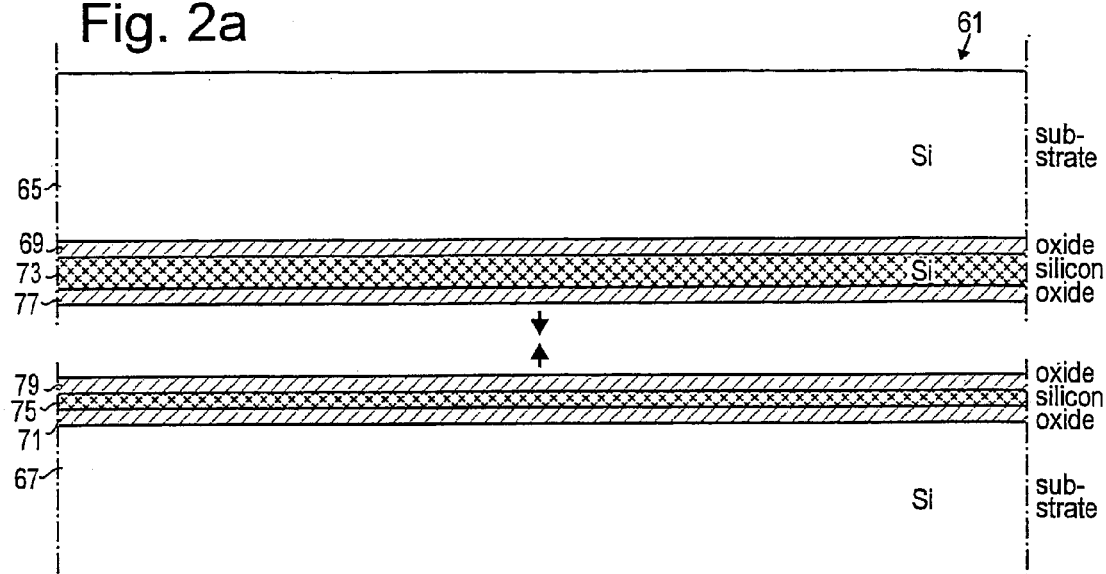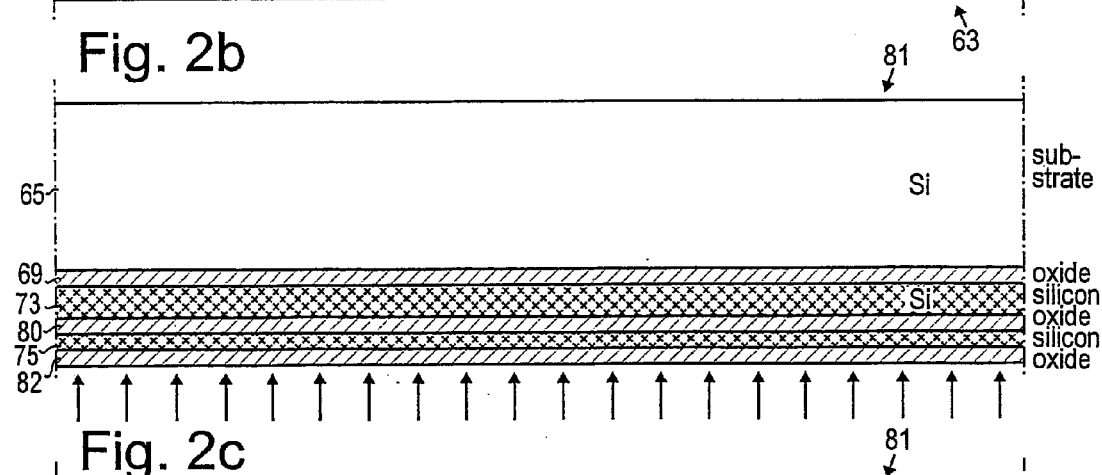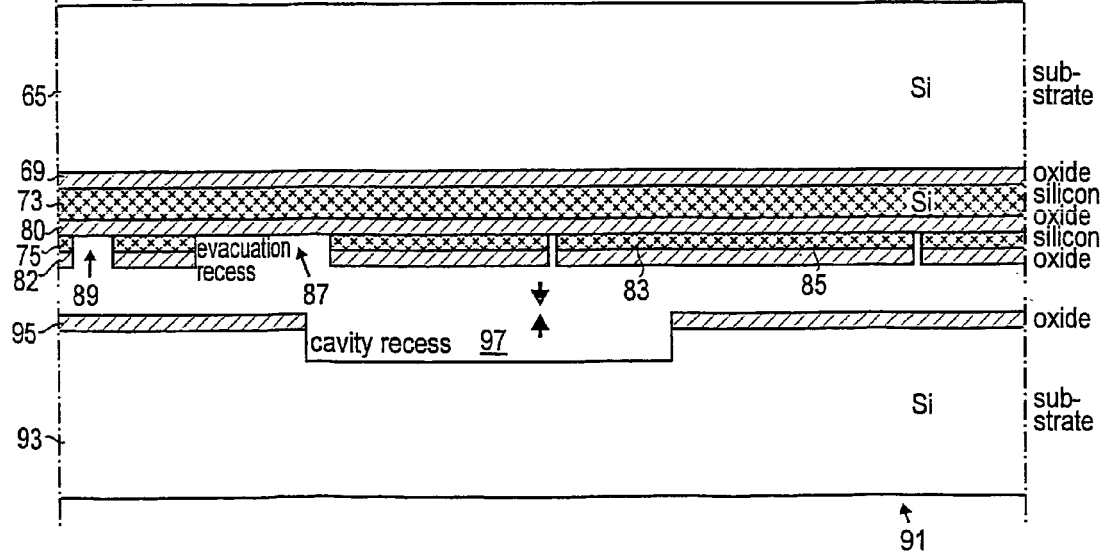

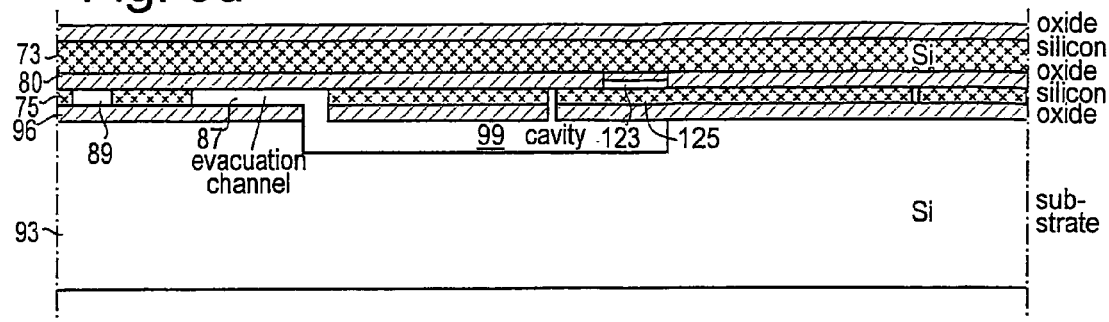
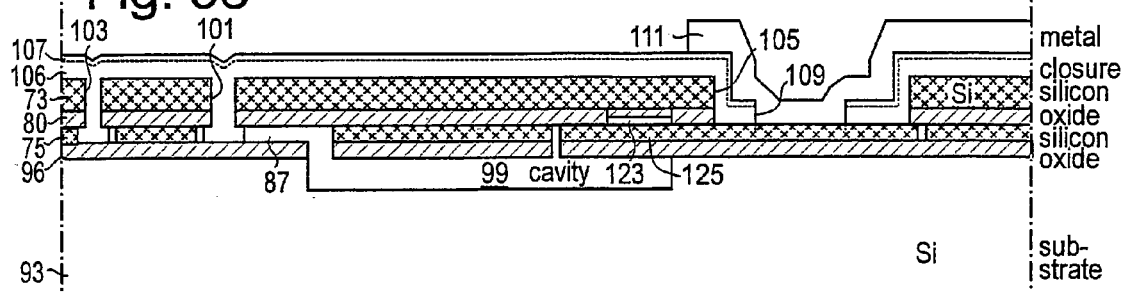
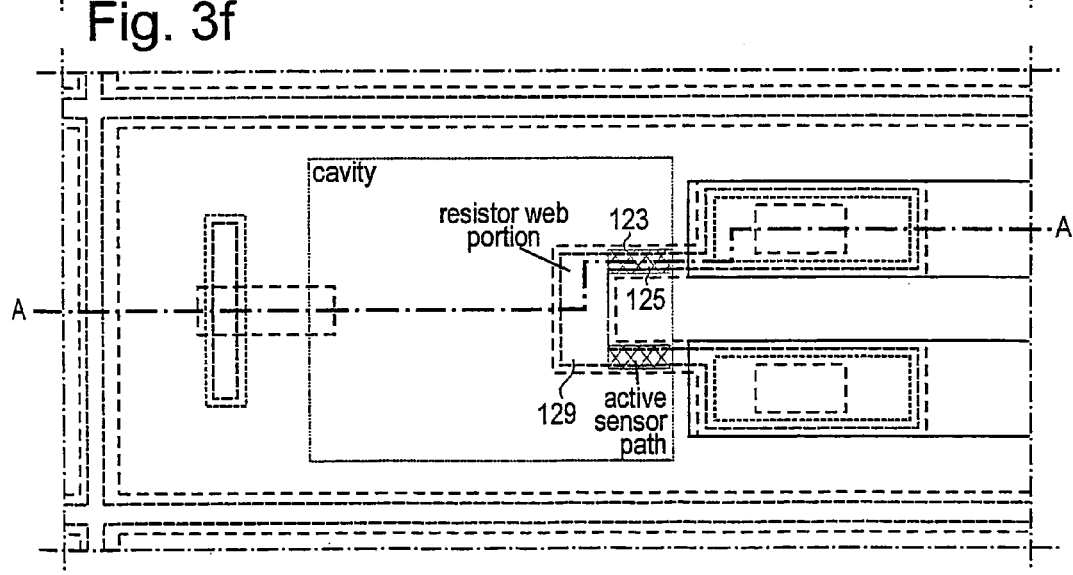

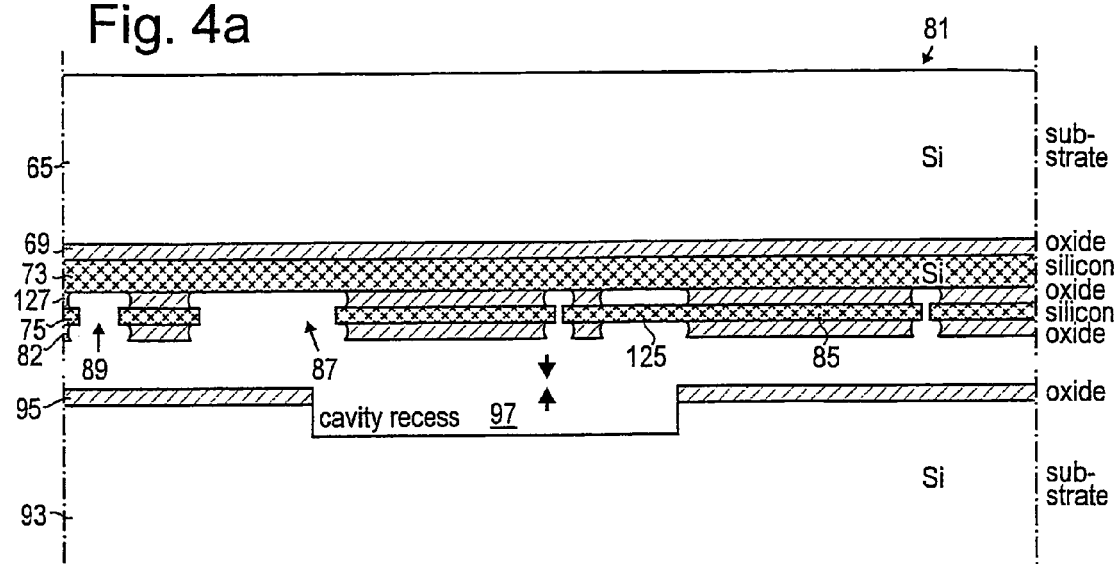
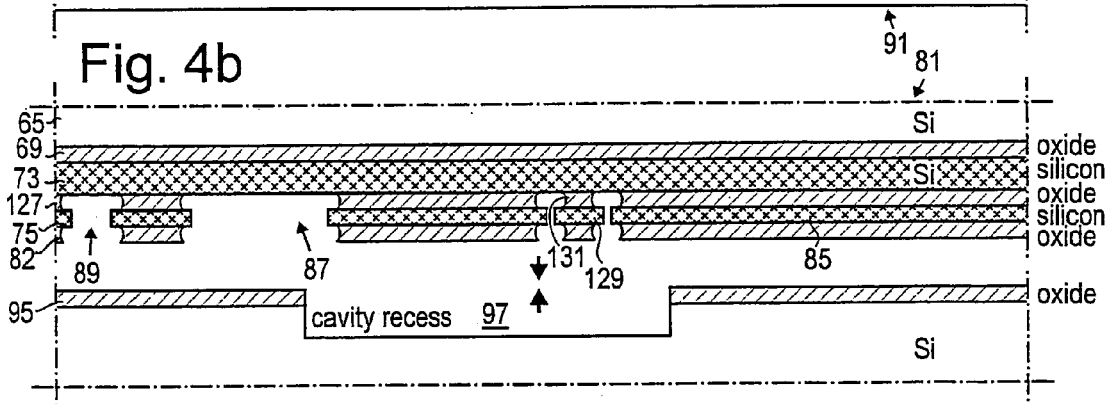
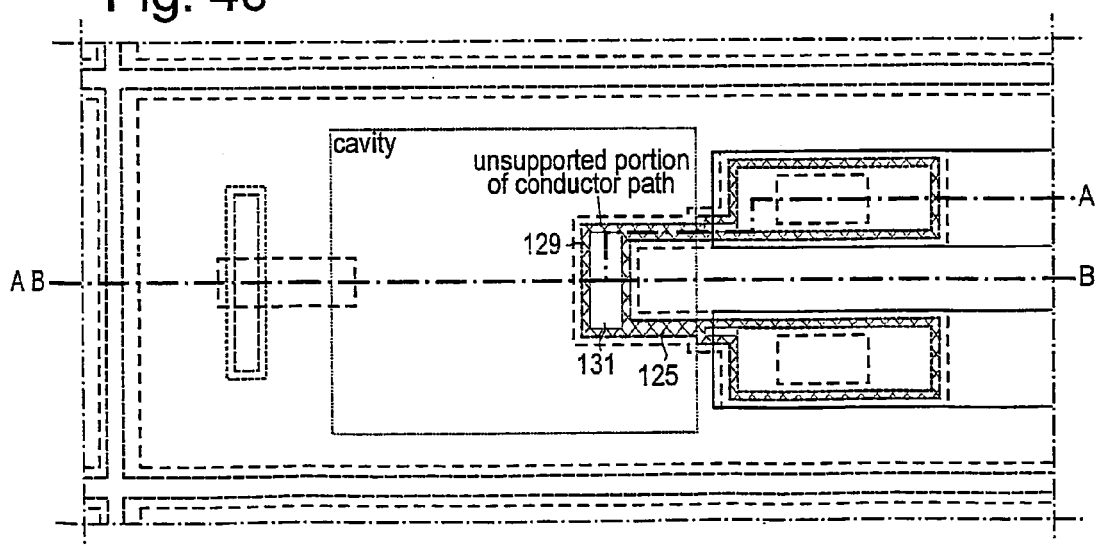

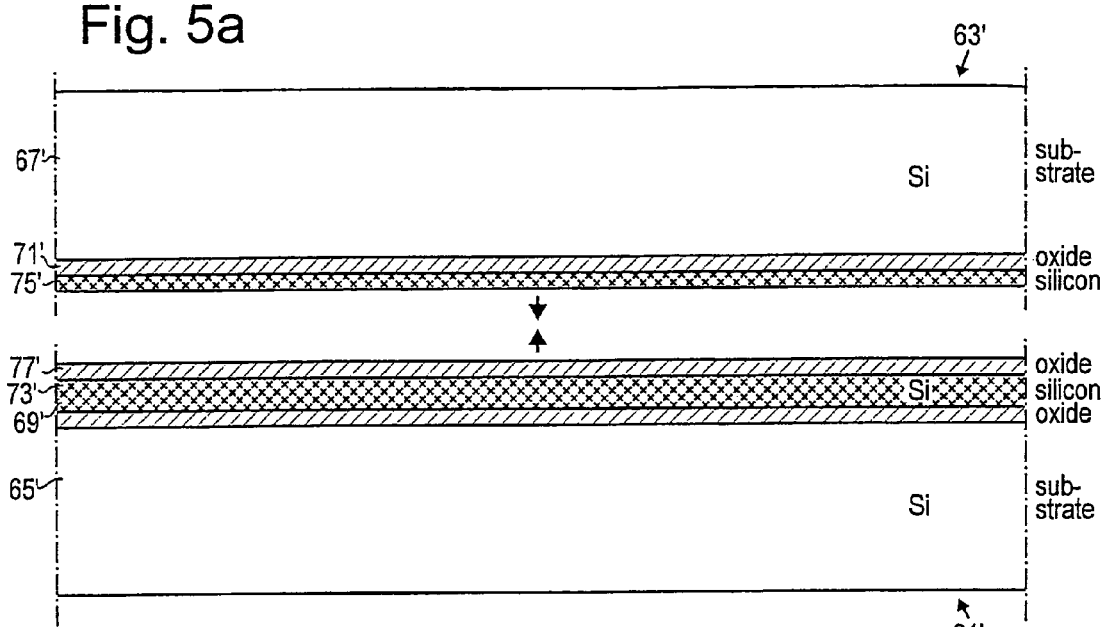
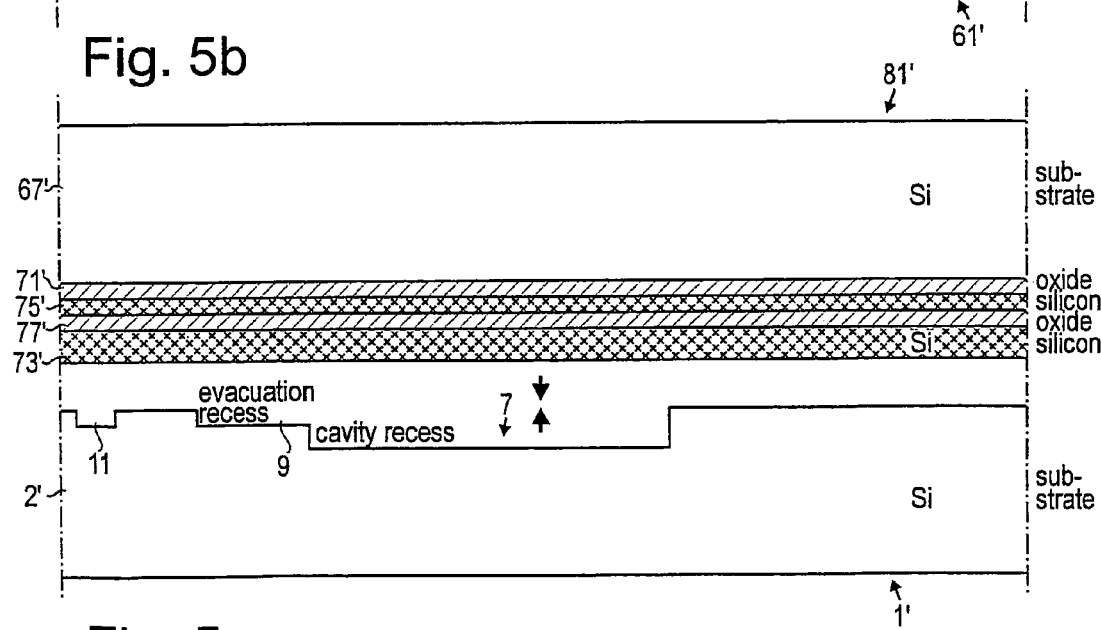
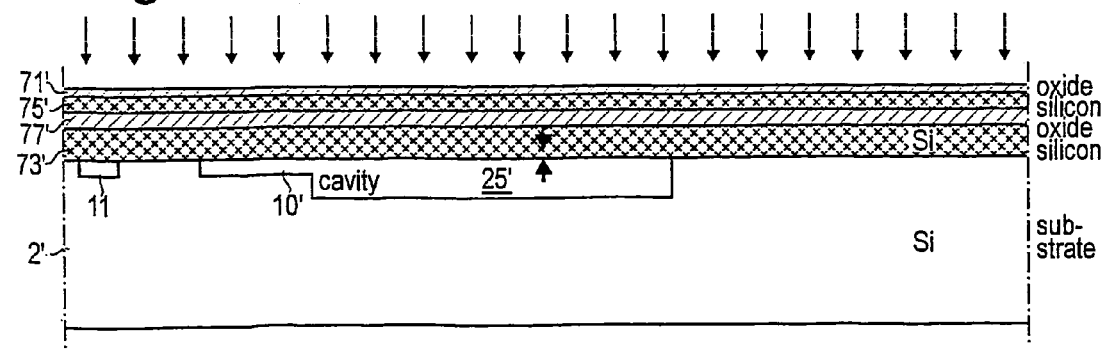

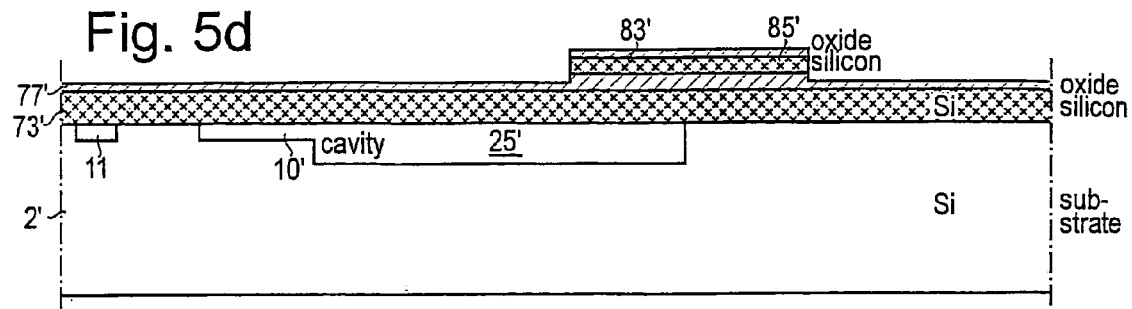
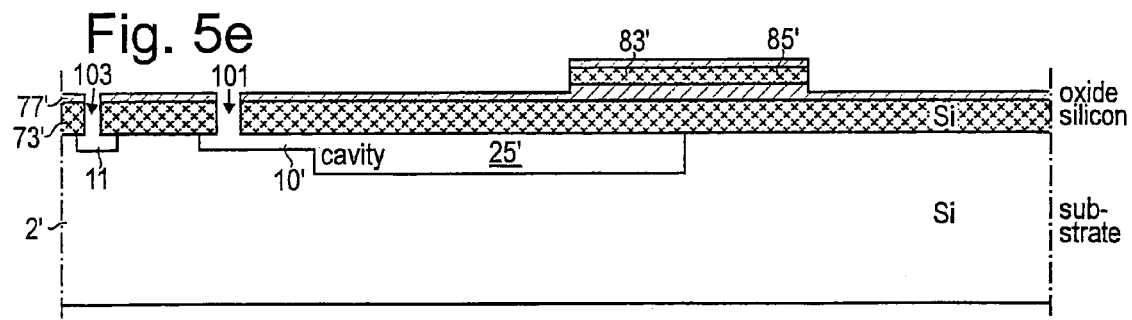
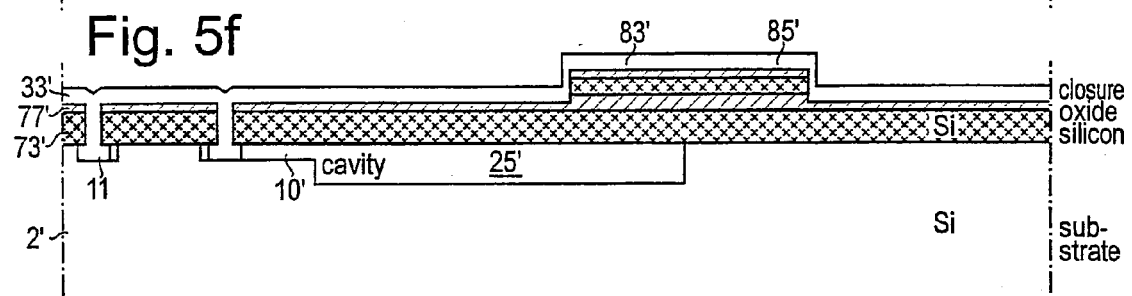
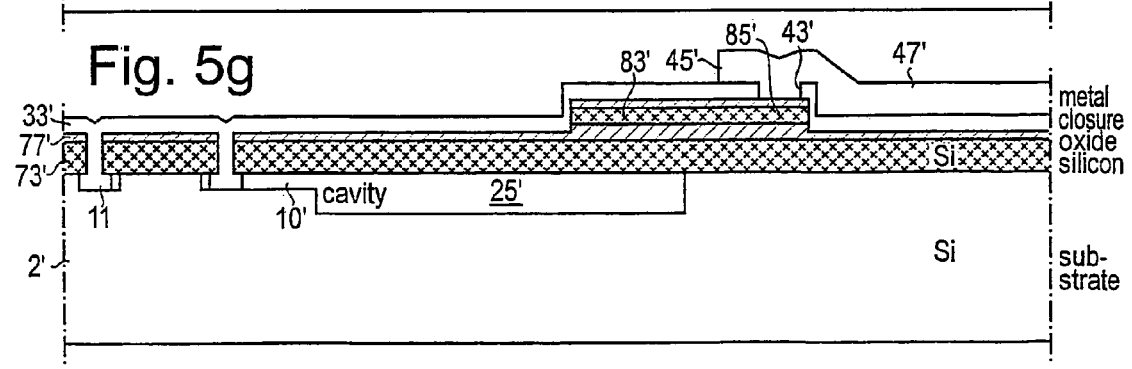

US 7,207,227 B2

PRESSURE SENSOR

RELATED APPLICATION

This application is a divisional application of U.S. Utility patent application Ser. No. 10/492,612, filed 15 Apr. 2004, which is the US national phase of international application PCT/SE02/01884, filed in English on 15 Oct. 2002, which designated the US. PCT/SE02/01884 claims priority to SE Application No. 0103471-9 filed 15 Oct. 2001. The entire contents of these applications are incorporated herein by reference.

TECHNICAL FIELD

The present application relates to micromachined pressure sensors, in particular for in vivo use and attached to catheters, and to methods of manufacturing such sensors.

BACKGROUND

Pressure sensors generally contain movable or deformable bodies, most often a deflectable diaphragm, and they can be either of the main types absolute pressure sensors and differential or relative pressure sensors. An absolute pressure sensor measures a pressure in relation to a vacuum pressure, the latter one generally existing in a relatively small cavity located at one surface of the diaphragm, the pressure to be measured acting on the opposite surface. A differential pressure sensor measures the difference of two pressures acting on opposite surfaces of the diaphragm. Some intermediate special types include gauges and sealed gauges where the pressure to be measured is measured in relation to a reference pressure, the reference pressure for sealed gauges existing in a closed cavity located directly at a surface of the diaphragm, see Gregory T. A. Kovacs, "Micromachined transducers handbook", WCB/McGraw-Hill New York 1998, pp. 248–258. The movement or deformation of the diaphragm can be sensed in different ways such by measuring the change of the capacitance of a suitable adapted capacitor, measuring the change of electric characteristics of a piezoresistive body or the change of the resistance of an electrical conductor coupled to the movement of the diaphragm and thereby being in varying strained states. For micromachined pressure sensors two major manufacturing methods are employed, bulk micromachining and surface micromachining, see e.g. the cited book by Kovacs and the article by Martin A. Schmidt, "Silicon wafer bonding for micromechanical devices", Solid State Sensor and Actuator Workshop, Hilton Head, S.C., Jun. 13–16, 1994, pp. 127–131.

Absolute pressure sensors and sealed gauge pressure sensors both need a hermetic sealing of a relatively small cavity at the active diaphragm to get a reference pressure, preferably a vacuum enclosure. This can be accomplished on a wafer basis using e.g. silicon wafer bonding under vacuum conditions. The two dominant bonding techniques are silicon direct bonding, also called silicon fusion bonding, see e.g. the article by Schmidt cited above, S. Mack, H. Baumann, U. Gösele, "Gas development at the interface of directly bonded silicon wafers: investigation on silicon-based pressure sensors", Sensors and Actuators A, Vol. 56, 1996, pp. 273–277, C. Harendt, B. Hofflinger, H.-G. Graf and E. Penteker, "Silicon direct bonding for sensor applications: Characterization of the bond quality", Sensors and Actuators A, Vol. 25–27, 1991, pp. 87–92, and anodic bonding, see e.g. H. Henmi, S. Shoji, K. Yoshimi and M. Esahi, "Vacuum packaging for microsensors by glass-silicon anodic bonding", Sensors and Actuators A, Vol. 43, 1994, pp. 243–248. Other possible techniques to achieve vacuum sealing of microcavities are by metal evaporation, see M. Bartek, J. A. Foerster, R. F. Wolfenbuttel, "Vacuum sealing of microcavities using metal evaporation, Sensors and Actuators A", Vol. 61, 1997, pp. 364–368, and by sealing using LPCVD, see Carlos H. Mastrangelo, James Hsi-Jen Yeh and Richard S. Muller, "Electrical and optical characteristics of vacuum-sealed polysilicon lamps", IEEE Trans. on Electron Devices, Vol. 39, No. 6, June 1992, pp. 1363–1375, and S. Sugiyama, T. Suzuki, K. Kawabata, K. Shirnaoka, M. Takigawa et al., "Microdiaphragm pressure sensor", IEDM Tech. Dig., 1997, pp. 184–187.

Generally, for example for use in an in vivo application such as a sensor attached to a catheter, a small micromechanical piezoresistive absolute pressure sensor is desired, having a high pressure sensitivity and a controlled temperature behaviour and a high long term stability. It should not be affected or change performance due to changes in the environment, e.g. it should not be affected by a humid environment. Also a designing and manufacturing process is desired, which is suitable for volume production, i.e. a batch fabrication process, with a high yield using standard micromachining process steps on a wafer level. A higher strain gauge factor, in comparison to pressure sensors existing today, is also desired.

It can be expected that micromachined devices having their essential parts made from monocrystalline material will have good long-term characteristics. Thus, pressure sensors having bonded monocrystalline diaphragms have been proposed. However, the handling of the very thin and therefore delicate monocrystalline diaphragms is very costly and can hardly be used in a process for mass fabrication. There are also problems as to pressure in the reference chamber when using bonding methods, e.g. direct or fusion bonding.

A problem associated with vacuum sealing using direct fusion bonding is that even if the bonding is performed under a reduced pressure the residual gas pressure inside the reference cavity after bonding is considerably higher than the original chamber pressure, which in turn gives problem with the temperature sensitivity. Vacuum sealing under UHV (Ultra High Vacuum) conditions is difficult and not suitable for production.

Another problem associated with direct fusion bonding includes voids between the bonded surfaces, due to problems with for example particles on the wafer surfaces before bonding. This significantly decreases the process yield.

A problem associated with surface micromachining and the use of polycrystalline silicon is that the material properties are not optimized, such as the gauge factor in the strain gauges, the diffusion through the diaphragm etc.

Different material in the same structure gives different temperature expansion coefficients.

A long process time including many steps is generally required.

The strain gauge has to be protected since it is placed on top of the diaphragm.

A better performance would probably be achieved with a planar and not so rough surface, which is the case in surface micromachining.

Pressure sensors based on SOI-substrates have been proposed, see U.S. Pat. No. 6,131,466 for Vigna et al., U.S. Pat. No. 5,510,276 for Diem et al. and U.S. Pat. No. 5,095,401 for Zavracky et al. Also, in U.S. Pat. No. 5,335,550 for Satou a method of producing a semiconductor pressure sensor having a monocrystalline diaphragm is disclosed. A lower silicon substrate having a recess is bonded to an upper silicon substrate having an oxide layer on its bottom surface. Thereafter, part of the upper substrate is removed by e.g. machining to produce a diaphragm. The accuracy of the thickness obtained of the diaphragm is dependent on the kind of process used for removing part of the upper substrate. Using machining as disclosed in this patent, the accuracy will not be very high. Also, the fact that a large amount or height of material must be removed will give a thickness of the diaphragm that cannot be very accurately defined and that can also have thickness variations.

SUMMARY OF THE INVENTION

It is an object of the invention to provide a small micromechanical or micromachined absolute pressure sensor having a high sensitivity to pressure variations, a controlled temperature behaviour and a low drift and to provide a method of manufacturing such a sensor.

It is another object of the invention to provide a micromachined pressure sensor that is not affected or changes performance due to changes in the environment and to provide a method of manufacturing such a sensor.

In particular it is an object of the invention to provide a micromachined pressure sensor that is not affected by a humid environment and to provide a method of manufacturing such a sensor.

It is another object of the invention to provide a designing and manufacturing process for fabricating a micromachined pressure sensor, which is suitable for volume production, i.e. a batch fabrication process, having a high yield.

It is another object of the invention to provide a micromachined pressure sensor having a strain gauge factor that is higher than that of currently available pressure sensors based on silicon that exist today and to provide a method of manufacturing such a sensor.

It is another object of the invention to provide a micromachined pressure sensor suitable for use in an in vivo application such as a sensor attached to a catheter insertable in a human body and to provide a method of manufacturing such a sensor.

It is another object of the invention to provide a micromachined pressure sensor having a diaphragm of an accurately controlled and well-defined thickness and to provide a method of manufacturing such a sensor.

It is another object of the invention to provide a micromachined pressure sensor having a diaphragm of an accurately uniform or constant thickness and to provide a method of manufacturing such a sensor.

A solution to the problems discussed above includes the use of a monocrystalline diaphragm, obtained from an SOI-wafer, the support or base layer, the substrate, of which is etched away. The preferred process includes sequential steps including direct or fusion bonding, making an opening for evacuation of a cavity holding the low reference pressure, the vacuum, and sealing the cavity by closing the opening using LPCVD (Low Pressure Chemical Vapour Deposition).

By the fact that the diaphragm is obtained from an SOI-structure it can be given a very accurately defined and constant thickness since the interior oxide layer of the SOI-structure can be used as an etch stop layer. The diaphragm can be additionally thinned by etching but this is normally not necessary. In any case, such additional etching only has to remove a minor portion of the material of the diaphragm, this preserving substantially the uniformity of the thickness thereof. Since such additional etching only removes little material the etching process can be given well-defined characteristics to still give the diaphragm a very well-defined thickness.

The combination above can be used together with sealing of the edges on the chip.

A double SOI-wafer or two bonded SOI wafers can be used in the process for achieving also monocrystalline strain gauges.

In the process only silicon and silicon based material is used except in the conductors for exterior electrical connection.

A process comprising relatively few steps is obtained using a combination of different technologies.

The strain gauge can be located under the diaphragm, facing the cavity, this achieving a good protection of the strain gauge and a diaphragm having a flat and smooth outer surface.

In modified processes active portions of the sensor path can be made to extend freely, not supported by any other material of the sensor.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments-presented hereinbelow with reference to the accompanying drawings, in which:

FIGS. 2a–2e are schematic sectional views illustrating important steps in the manufacture of a micromachined pressure sensor having a monocrystalline diaphragm and a monocrystalline strain gauge, FIGS. 3a–3e are views similar to those of FIGS. 2a–2e illustrating steps for manufacturing a pressure sensor having freely extending sensor paths, FIG. 3f is a plan view illustrating the pressure sensor of FIG. 3e, FIGS. 4a and 4b are views similar to that of FIG. 3e illustrating etching steps according to an alternative process of manufacturing a pressure sensor having freely extending sensor paths, FIG. 4c is a plan view illustrating the pressure sensor manufacturing by using the etching steps illustrated in FIGS. 4a and 4b, the sectional views of FIGS. 4a and 4b taken along the lines A—A and B—B respectively, and FIGS. 5a–5g are schematic sectional views illustrating important steps in a method that is an alternative of the method illustrated in FIGS. 2a–2f of manufacturing a micromachined pressure sensor having the a monocrystalline strain gauge located at the outer surface of the monocrystalline diaphragm.

DETAILED DESCRIPTION

Methods of producing micromachined pressure sensors and the resulting pressure sensors having monocrystalline diaphragms obtained will now be described, the diaphragms in the various alternatives being obtained from an SOI-structure.

First an embodiment using a single SOI (Silicon On Insulator) structure will be described, this being the simplest alternative. The main advantage of all embodiments is the monocrystalline diaphragm that probably reduces the long-term drift of the sensor characteristics. Also, the monocrystalline structure is more resistive to moisture than other more porous materials such as polysilicon. A general advantage is the very well-defined and uniform thickness of the diaphragms in all embodiments, this giving the diaphragms desired elastic properties.

Figure 1I:
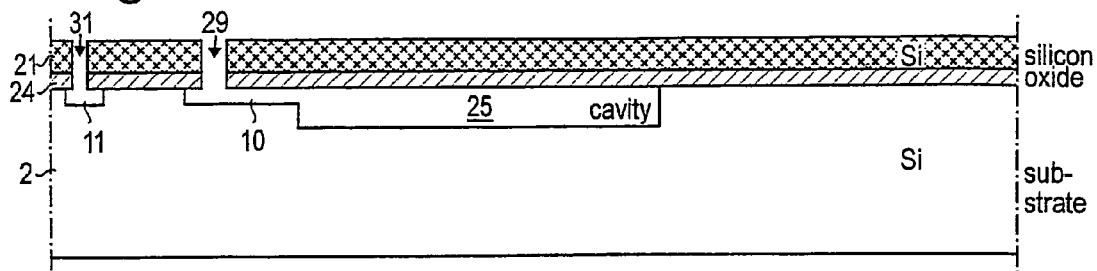
FIGS. 1a–1b are schematic sectional views illustrating first steps in the manufacture of a micromachined pressure sensor having a monocrystalline diaphragm obtained from an SOI-wafer.
FIG. 1c is a plan view of the structure illustrated in FIG. 1b.
FIG. 1d is a schematic sectional view illustrating a further step used in the manufacture of a micromachined pressure sensor according to FIGS. 1a-1c.
FIG. 1e is a plan view of the structure illustrated in FIG. 1d, FIGS. 1f–1m are schematic sectional views illustrating further step used in the manufacture of a micromachined pressure sensor according to FIGS. 1a–1e.
FIG. 1n is a plan view of the finished pressured sensor illustrated in FIG. 1m, the cross-sectional views of FIGS. 1a, 1b, 1d, 1f–1m taken along the line A—A.

In the first embodiment a lower structure 1 is first produced by processing a silicon substrate such as a wafer 2, see FIG. 1a. A multitude of identical structures is produced in the following processing steps. However, only one structure is illustrated in the figures. On the top surface of the substrate an oxide layer 3 is produced by thermal oxidation. By lithography a mask layer 5, see FIG. 1b, is applied to the surface of the oxide and then a recess 7 that will become part of the cavity of the sensor is produced by etching in two steps, first for etching the oxide layer 3 and thereafter for etching the underlying silicon of the substrate 2. The mask layer 5 is then removed. The resulting structure as seen from above is shown in FIG. 1c. More shallow recesses 9, 11 are then produced by defining them by another lithographic mask 13, see FIG. 1d, and then etching in two steps and removing the mask. The cavity recess 7 can have a rectangular shape, as shown in FIG. 1c, and preferably a substantially square shape as viewed from above. The first shallow recess 9 will form part of a channel for later evacuation of the sensor cavity 7. It can have a rectangular shape extending from the center of a side of the cavity recess 5 and being much shorter in the horizontal direction, i.e. along the substrate surface, than the sides of the cavity recess, see FIG. 1e. The second shallow recesses 11 are shallow grooves passing all over the wafer forming or defining saw paths where the wafer will be finally split to give a plurality of individual micro-dimensioned sensor chips.

The next step is to bond an SOI-wafer 15 to the top surface of the processed substrate. The SOI-wafer comprises a silicon substrate 17 having on a surface thereof a structure including a silicon oxide layer 19, a monocrystalline silicon layer 21 that will become the diaphragm of the sensor and cover the cavity recess 7 and an outermost, as shown in the figures, bottom silicon oxide layer 23. This oxide layer is bonded to the oxide layer 3 of the substrate 1 to form an oxide layer 24. Generally, the outermost oxide layers can be excluded so that the bonding is made between a silicon surface and an oxide layer, between two silicon surfaces or between two silicon oxide layers. At least one outermost silicon layer is required in the case where it has to act as an electrically isolating layer for the sensor path, see the description hereinafter. The bonding is preferably made by direct silicon bonding or silicon fusion bonding, see the articles cited, above and K. Petersen, D. Gee, R. Craddock, J. Brown, L. Christel, "Surface micromachined structures fabricated with silicon fusion bonding", IEEE Trans. 1991, pp. 397–399, L. Parameswaran, V. McNeil, M. A. Huff and M. A. Schmidt, "Sealed-cavity microstructure using wafer bonding technology", The 7th International Conference on Solid-State Sensors and Actuators, Transducers'93, pp. 274–277, and M. A. Huff, A. D. Nikolich, M. A. Schmidt, "Design of sealed cavity microstructures formed by silicon wafer bonding", J. Microelectromechanical Systems, Vol. 2, No. 2, June 1993, pp. 74–81.

After finishing the bonding process, the silicon substrate 17 of the SOI-wafer 15 is etched away completely and also most of the interior oxide layer 19 of the same wafer to produce the structure illustrated in FIG. 1g. Thus, the etching is stopped by or at the interior oxide layer. Thereby, the silicon substrate 17 can be removed by dry or wet etching with a very high selectivity resulting in an extremely good control of and uniformity of the diaphragm thickness. That is, the thickness of the diaphragm can be very accurately defined and it will have a very accurately constant value over the whole area of the diaphragm. Now a closed cavity 25 has been produced having a rigid base structure at its bottom side and a diaphragm at its top side. Also an evacuation channel 10 has been formed connected to the cavity. However, residual gas exists in the cavity 25 and the evacuation channel.

Figure 1J:
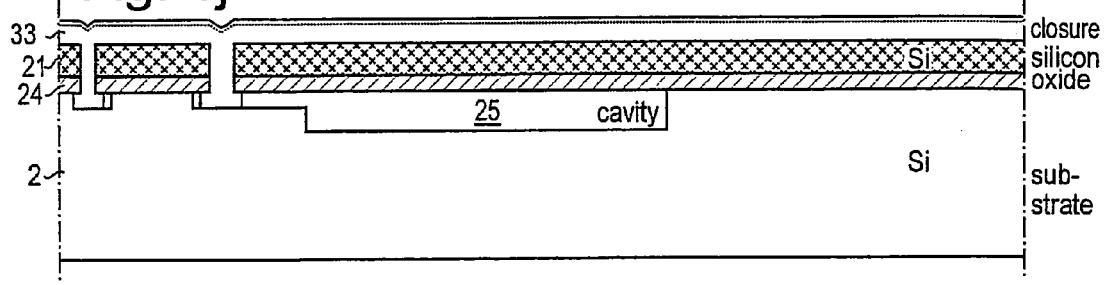
Figure 1K:
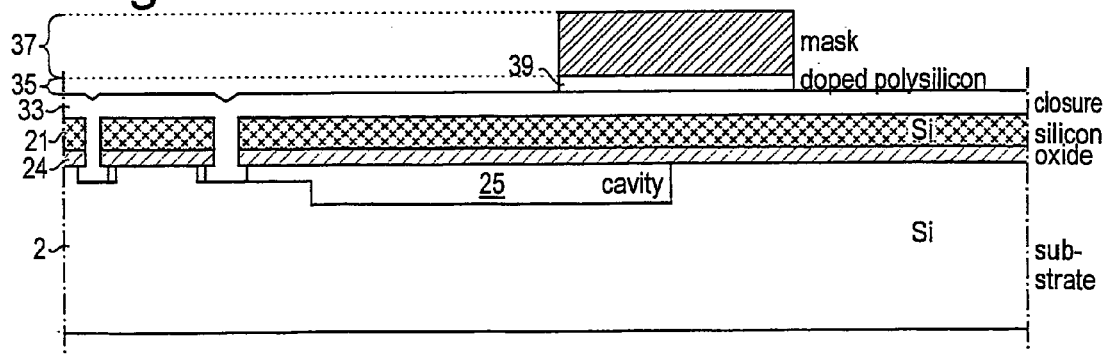

A lithographic mask layer 27 is then applied to the exposed surface of the monocrystalline silicon layer 21 and the structure is etched to produce, in the openings of the mask, narrow recesses or ditches 29, 31 extending down to the channel recess 9 and to the saw path 11 respectively. Then the mask layer 27 is removed giving the structure seen in FIG. 1i. The cavity 25 is now in communication with the exterior by the channel recess 9 and the channel 29. This communication channel of the cavity is then closed by depositing first a layer of oxide by LPCVD (Low Pressure Chemical Vapour Deposition) using thermal decomposition of TEOS, tetraethyl-orthosilicate, and second, on top of it, silicon nitride also by LPCVD forming together with each other a closure layer 33 all over the top surface of the structure, see FIG. 1j. For a suitably narrow etched channel 9, the TEOS-oxide closes this channel and thereby the cavity, see U.S. Pat. No. 4,996,082 for H. Guckel, D. W. Burns. The nitride layer protects the oxide layer and makes it impermeable, e.g. to moisture.

Figure 1L:
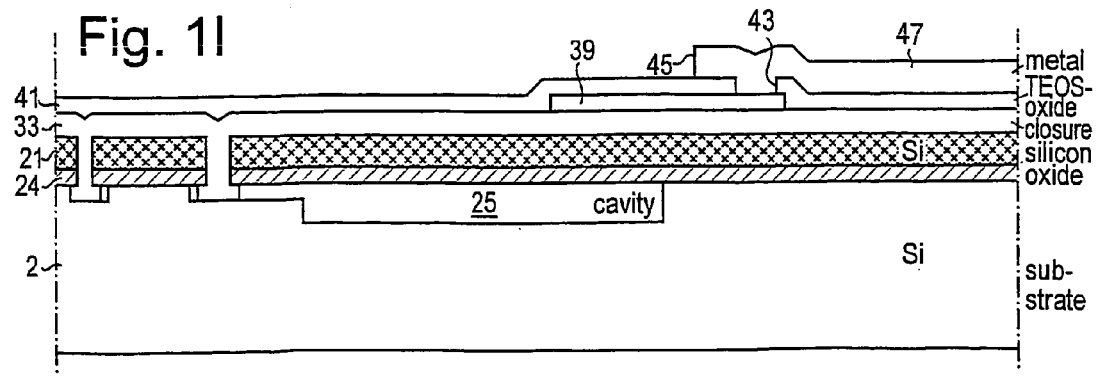

Finally, the electrical strain gauge or piezoresistive structure that senses the deformation of the diaphragm portion of the silicon layer 21 is applied. Thus, first a polysilicon layer 35 is applied all over the surface and is then subjected to ion-implanting to give it a suitable electrical conductivity. To make the conductivity of the polysilicon layer substantially uniform the structure is annealed at suitable conditions. The surface of the structure is then covered by a lithographic mask 37 and the polysilicon layer is etched away in the regions not covered by the mask that is then removed. The formed polysilicon structure forms a strain gauge and/or piezoresistive gauge and can have the shape of an sufficiently long strip 39 having a simple loop configuration, compare FIG. 1*n*, or possibly a zigzag configuration, on top of the region of the layer 21 that forms the diaphragm, e.g. over only that part of that region located at the side of the cavity 25 that is opposite the channel recess 9. The polysilicon strip 39 ends at locations at some distance of the diaphragm region and is there electrically connected. For that purpose an electrically isolating layer is first applied such as a deposited TEOS-oxide layer 41. A lithographic mask, not shown, is then applied and the oxide layer 41 is etched away in the windows of the mask. The mask is removed and then contact holes 43 have been produced down to the ends of the polysilicon strip 39. A layer 45 of a suitable metal is deposited over the surface of the structure and is patterned in the conventional by etching through lithographically defined openings. Thereby electrical conductors 47 extending to or including contact pads for exterior electrical connection are produced, see FIGS. 1*l* and 1*m*.

The surface of the structure can finally be protected by depositing a passivating layer 49, see FIG. 1*m*, and is opened at the places of the contact pads, not shown, by etching after applying a suitable mask 51. It is also opened at the portion of the silicon layer 21 forming the diaphragm and the etching parameters of this step are selected so that the etching is stopped by the metal layer and so that the surface of the silicon layer at the cavity is exposed. This opening step can, if required, be made in two separate masking and etching steps. In another etching step, using a different etching agent, the exposed portion of the monocrystalline silicon layer can be etched to produce a thinned portion forming the diaphragm having desired elastic properties. However, this final etching step then only removes a relatively thin surface layer of the diaphragm portion, the height of which can still be accurately controlled.

In an alternative way of manufacturing a pressure sensor, an upper structure obtained from two SOI-wafers 61, 63 is used. Thus, as illustrated in FIG. 2*a*, two SOI-wafers of the basic structure shown in FIG. 1*f*, each including a substrate 65, 67, an intermediate oxide layer 69, 71, a monocrystalline silicon layer 73, 75 and an exterior oxide layer 77, 79, are bonded to each other at their oxide surfaces forming a center oxide layer 80. The monocrystalline silicon layers 73, 75 located between the oxide layers of the two wafers have thicknesses, which are adapted to their use in the finished structure. Thus, one silicon layer 75, in the figures that of the lower SOI-structure, will form the resistive conductor of the strain gauge structure and bond pads and conductors connecting the gauge strip to the bond pads. The other silicon layer 73, in the figures that of the upper SOI-structure, will form the movable diaphragm of the sensor and can have a thickness larger than that of the silicon layer in the lower structure. After bonding the wafers, the silicon substrate layer 67 of the original wafer that has the layer which will form the strain gauge, i.e. the substrate of the lower wafer as seen in the figures, is etched away to produce the structure 81 of FIG. 2*b*.

Thus, in the structure 81 both the diaphragm and the strain gauge are made from mono-crystalline material. This gives i.e. a higher sensitivity of the strain gauge and very good long-term characteristics. Also, the strain gauge will be located inside the sensor cavity, protected by the diaphragm.

In the upper structure 81 formed, the silicon layer 75 that will form the strain gauge is exposed, possibly protected by an oxide layer 82 remaining from the interior oxide layer 71. This silicon layer is given a suitable, uniform electrical conductivity by ion implanting a suitable material, as indicated by the arrows in FIG. 2*b*, and thereafter annealing the structure at a suitable temperature for a suitable time. A mask layer, not shown, is then applied by lithography to define the structure of the strain gauge 83, contact pads 85, evacuation channels 87 and saw paths 89 as seen in FIG. 2*c*. Thereafter the material of the silicon layer having electrical conductivity is etched away in the openings of the mask and the mask is removed.

The lower structure 91 is also shown in FIG. 2*c* and is produced in the way described above for the first steps of the lower structure in the first embodiment, compare FIGS. 1*a*, 1*b* and 1*c*. Thus, the surface of the silicon wafer 93 can be oxidized to produce a top oxide layer 95 and then the recess 97 that will form part of the cavity of the sensor is produced. It is produced by applying a suitable mask layer, not shown, etching away the silicon oxide in the openings of the mask and then silicon material down to suitable depth and finally removing the mask.

Figure 2D:
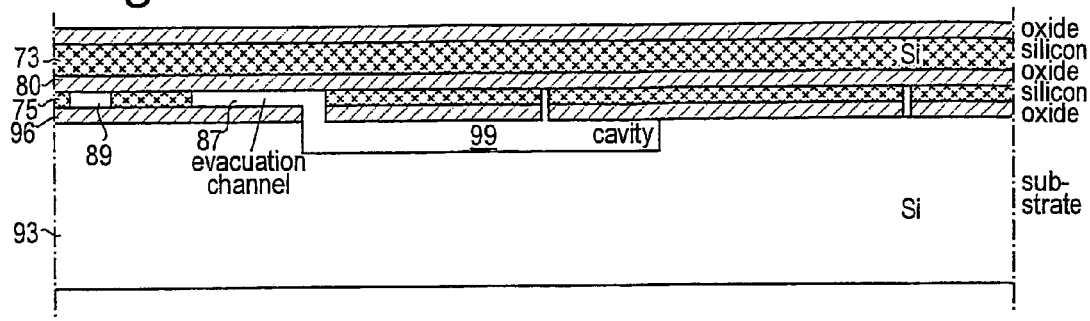

The upper and lower structures 81, 91 are then bonded to each to form the cavity 99 and the silicon substrate layer 65 of the upper structure 81 is etched away completely, possibly also most of the intermediate oxide layer 69 to produce the structure illustrated in FIG. 2*d*. A mask layer, not shown, is then lithographically applied defining channels 101 to the evacuation channels 87, grooves 103 to form upper portions of the sawing paths and contact holes 105 down to the contact pad areas 85 of the layer 75. Then the structure is etched by using first an etching agent suitable for removing silicon material and then an etching agent for removing only silicon oxide. The mask layer is then removed.

Figure 2E:
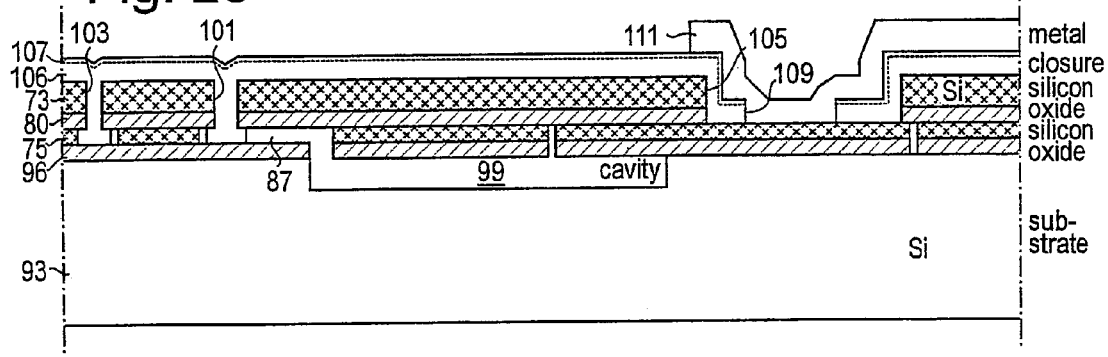

The sensor cavities 99 are now in communication with the exterior and as above they are hermetically sealed under a very low pressure by applying a TEOS-oxide layer 106 and on top thereof a silicon nitride layer forming a closure layer 107 as seen in FIG. 2*e*. Contact holes 109 through these last two layers 106, 107 are then made by applying a lithographic mask, etching through the windows of the mask and removing the mask layer. A metal layer 111 is applied by deposition and patterned by lithography and etching as above. A passivating layer, not shown, can be finally applied. On the passivating layer a mask layer is then lithographically applied, etching through the openings of the mask is made to make openings in the passivating layer down to the surface of the silicon layer 73 forming the diaphragm and to bonding pads of the metal layer 111. The mask layer is then removed. In a final etching step the diaphragm portion of the silicon layer can as above be thinned to give it desired electrical characteristics, producing a structure similar to that illustrated in FIGS. 1*m* and 1*n* but having an interior resistive loop.

Figure 2F:
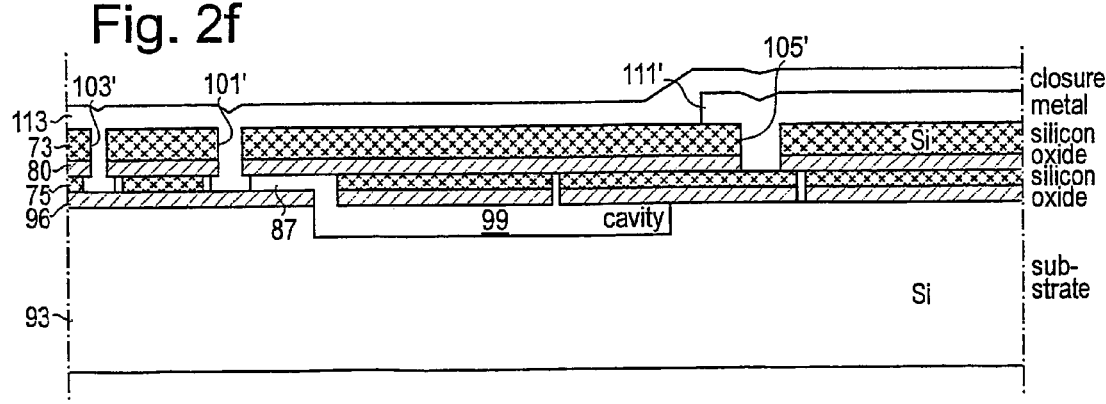
FIG. 2f is a schematic sectional view illustrating an alternative embodiment of a micromachined pressure sensor having a monocrystalline diaphragm and a monocrystalline strain gauge.

Alternatively, the cavity can be closed or sealed after etching the metal layer, i.e. before or in the step of applying the passivating layer. Then, see FIG. 2*f*, directly after patterning the monocrystalline silicon layer 73 forming the diaphragm, lithography and etching steps are performed to produce only the contact holes 105'. Then the metal layer 111' is deposited and is etched through a mask to produce the conductor pattern for exterior connection. Then the recesses 101', 103' for the cavity channels and the sawing paths are made as described above, the mask used thus having no windows for producing contact holes. The sawing paths are filled and the cavity is sealed by producing an LTO-oxide and thereupon applying a silicon nitride layer by PECVD to form a closure layer 113 also acting as a passivating layer.

The methods of manufacturing a pressure sensor described with reference to FIGS. 2*a*–2*f* can be easily modified to give a pressure sensor having sensor paths located on the outer side of the diaphragm. Then, the same type of SOI-wafers, see FIG. 2a, can be used. As illustrated in FIG. 5a, the upper SOI-wafer 63' includes a substrate or carrier layer 67', an intermediate oxide layer 71' and a monocrystalline silicon layer 75' that will form the sensor paths. The exterior oxide layer has been omitted in the upper structure. The lower SOI-wafer 61' includes a substrate or carrier layer 65', an intermediate oxide layer 69', a monocrystalline silicon layer 73' that will form the diaphragm and an exterior oxide layer 77'. The wafers are bonded to each other and the silicon substrate layer 65' of the original wafer 61' that has the layer which will form the diaphragm, i.e. the substrate of the lower wafer as seen in the figures, is etched away to produce an upper structure 81' illustrated in FIG. 5b.

This upper structure 81' is bonded to a lower, base structure 1' of the kind also shown in FIG. 1f but in which the outer oxide layer is omitted. The bonding can be very easily made since no accurate positioning of the structures in relation to each other is required. The base structure omprises a relatively thick, stable and rigid substrate or base plate 2' that has been etched to produce the cavity recess 7, the evacuation recess 9 and the saw grooves 11. By bonding the upper and lower structures 81', 1' to each other the cavity 25' and the evacuation channel 10' are formed. The remaining silicon substrate layer 67' of the upper structure 81' is etched away completely and most of the intermediate oxide layer 71' to produce the structure illustrated in FIG. 5c. The silicon layer 75' that is now exposed is given a suitable, uniform electrical conductivity by ion implanting a suitable material, as indicated by the arrows in FIG. 5c, and thereafter annealing the structure at a suitable temperature for a suitable time. A mask layer, not shown, is then applied by lithography to define the structure of the strain gauge 83' and contact pads 85' as seen in FIG. 5d. Thereafter the material of the silicon layer having been given electrical conductivity is etched away in the openings of the mask and the mask is removed.

A mask layer, not shown, is then lithographically applied defining channels 101 to the evacuation channels 10' and grooves 103 to form upper portions of the sawing paths 11, see FIG. 5e. Then the structure is etched by using first an etching agent suitable for removing oxide and then an etching agent for removing only silicon. The mask layer is then removed.

The sensor cavities 25' are now in communication with the exterior and as above they are hermetically sealed under a very low pressure by applying a closure layer 33' including e.g. a TEOS-oxide layer having a thickness of 2000 Å and on top thereof a silicon nitride layer forming a closure layer 107 as seen in FIG. 5f. Contact holes 43' through the closure layer are then made by applying a lithographic mask, etching through the windows of the mask and removing the mask layer. A metal layer 111' is applied by deposition and patterned by lithography and etching as above. As described above, a passivating layer, not shown, can be finally applied and patterned to expose the diaphragm and bonding pads of the metal layer 111'.

The manufacturing processes described with reference to FIGS. 2a–2f can also be modified to produce a pressure sensor having an at least partly freely suspended sensor path, i.e. a sensor path or part of a sensor path such as a resistor or conductor path connected at one end to the material at the edge of the cavity and at another end to a place on the diaphragm well inside the cavity, the path extending freely, without support between its ends. Such freely suspended sensor paths can give the pressure sensor an increased accuracy.

Figure 3A:
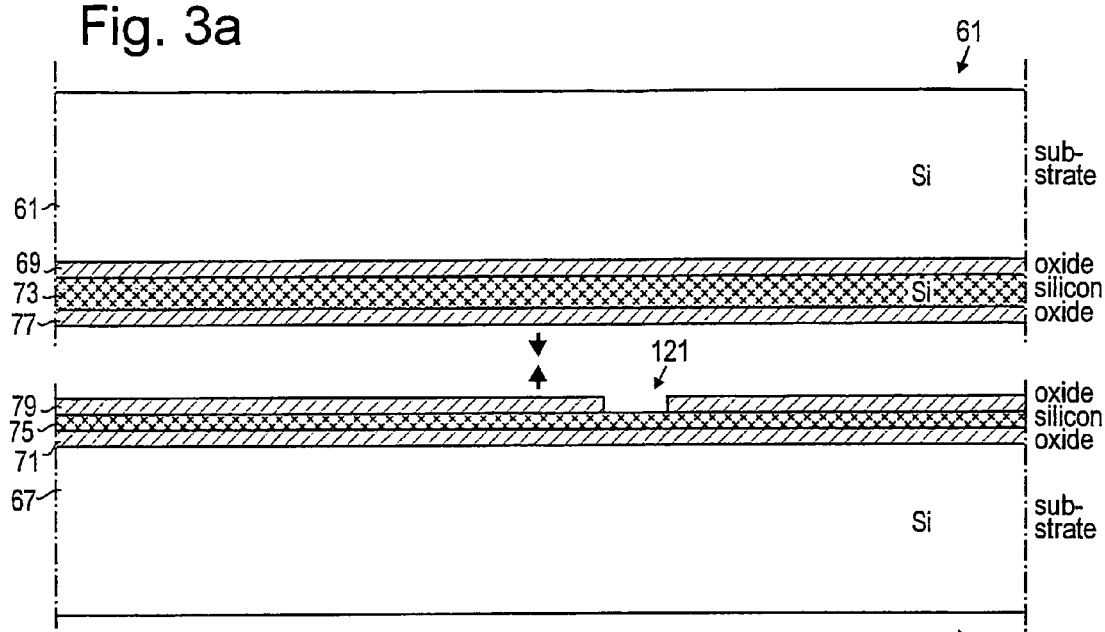
Figure 3B:
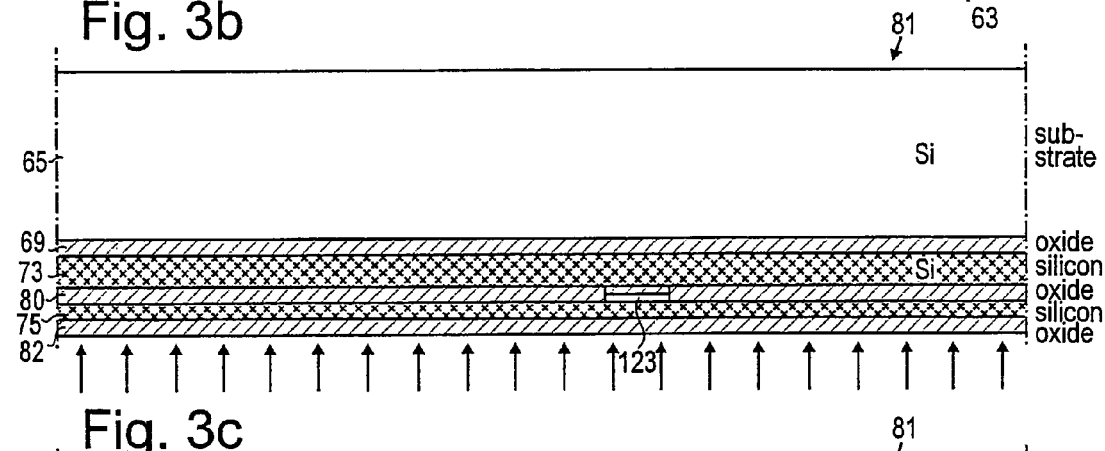
Figure 3C:
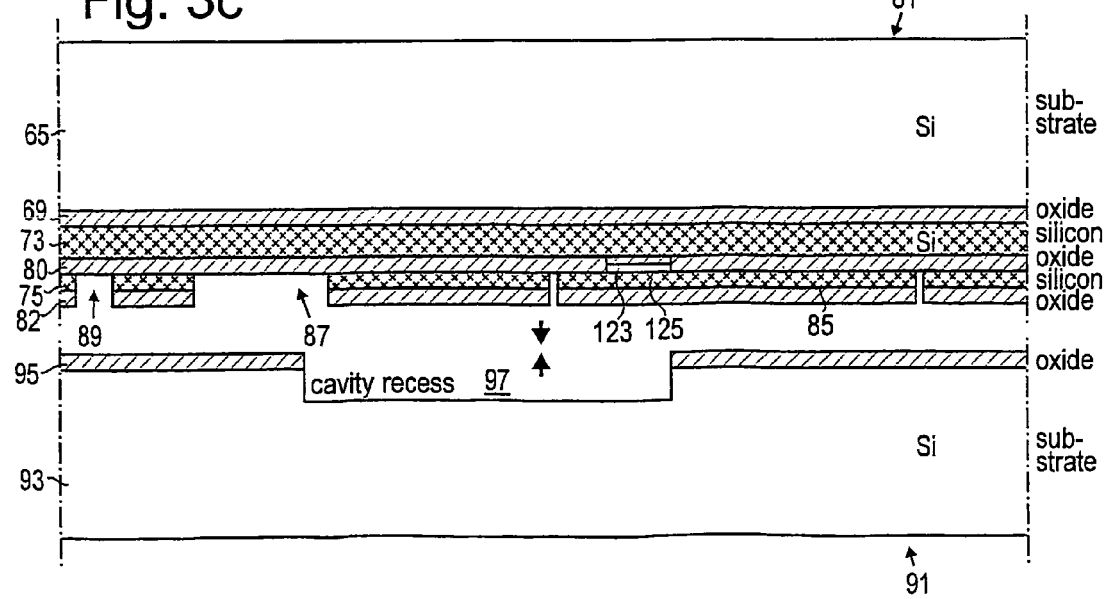

In a first process, see FIG. 3a, in the lower SOI-wafer 63 the exterior oxide layer 79 is opened at the places 121 where the sensor paths are to be formed. This can be accomplished as conventional by applying a lithographic mask, etching using a suitable etching agent and removing the mask. In the bonding step, see FIG. 3b, the opened oxide areas form thin or low cavities 123 between the monocrystalline silicon layers 73 and 75, the exterior oxide layer 77 of the upper SOI-wafer 61 remaining in these cavities. Alternatively, this oxide layer could instead have been opened or the two external oxide layers 77 and 79 could have been opened at the same areas. The following processing steps are the same ones as illustrated in and described with reference to FIGS. 2b–2f, see FIGS. 3b–3f. The finished structure is shown in FIGS. 3e and 3f. The thin cavities are seen to extend over the two resistor paths 125, separating them from contact with or attachment to the silicon layer forming the diaphragm.

In a second process the same processing steps as illustrated in FIGS. 2a and 2b are first executed. In the etching step corresponding to that seen in FIG. 2c, of the now external oxide layer 71 and the monocrystalline silicon layer 75 of the composite SOI-wafer 81 the etching characteristics, such as etching times, temperatures and agents, are selected to also etch the center oxide layer 127 resulting from the former exterior oxide layers 77, 99 but not the monocrystalline silicon layer 71 that is to form the diaphragm, see FIGS. 4a and 4b. The etching is made in at least three steps having different characteristics, the first and second steps defining the conductor path of the resistor sensing the bending of the diaphragm and a third step only etching oxide. In the third step the etching is driven so far that the center oxide layer 127 is overetched some distance beyond the edges of the layer 75 forming the resistor, the width of the active resistor paths 125 used to sense the deflection of the diaphragm being selected to be so small that these active paths are separated by the overetching of the inner oxide layer from being supported thereby and by the layer forming the diaphragm. The web portion 129 of the conductor path connecting the two branches of the conductor which are the active ones, the resistance thereof changing when the diaphragm is bent, is wider than the active paths. Its width is designed to be so large that an oxide island 131 remaining from the center layer 127 still attaches firmly the web portion to a place on the diaphragm that will be located well inside the active cavity of the pressure sensor, see FIG. 4c. The unsupported portions of the conductor are illustrated by the cross-hatched areas in FIG. 4c.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A micromachined pressure sensor including a first silicon substrate having a cavity recess in an upper surface thereof, a closing structure including a monocrystalline silicon layer bonded to the first silicon substrate closing the cavity recess and forming a reference chamber, a portion of the closing structure covering the cavity recess to form a diaphragm, a sensor path connected to sense movements of the diaphragm, wherein the closing structure is obtained from a silicon-on-insulator (SOI) structure, the diaphragm is a portion of a first monocrystalline silicon layer of the SOI structure and the sensor path is a portion of a layer deposited on an interior surface of the diaphragm facing the reference chamber.

2. A micromachined pressure sensor according to claim 1, wherein the sensor path is a portion of a second monocrystalline layer comprised in the SOI structure.

3. A micromachined pressure sensor according to claim 1, wherein the sensor path comprises active sensor portions that extend freely over a region of the diaphragm.

4. A micromachined pressure sensor according to claim 3, characterized in that the active sensor portions extend freely between an edge of the diaphragm and a location in the interior of the diaphragm.

5. A micromachined pressure sensor comprising:
  a first silicon substrate including a cavity recess in an upper surface of the first silicon substrate;
  a silicon-on-insulator (SOI) structure including a silicon layer and bonded to the first silicon substrate, the SOI structure forming a closing structure that closes the cavity recess to form a reference chamber, a portion of the closing structure covering the cavity recess forming a diaphragm; and
  a sensor path being a portion of a layer deposited on an interior surface of the diaphragm facing the reference chamber and electrically connected to sense movements of the diaphragm.

6. The micromachined pressure sensor of claim 5 wherein the sensor path is a sensing part of a strain gauge.

7. The micromachined pressure sensor of claim 5 wherein the sensor path is a sensing part of a piezoresistive gauge.

8. The micromachined pressure sensor of claim 5, wherein the sensor path is a portion of a second silicon layer included in the SOI structure.

9. The micromachined pressure sensor of claim 5 wherein the sensor path comprises active sensor portions extending freely over a region of the diaphragm.

10. The micromachined pressure sensor of claim 9 wherein the active sensor portions extend freely between an edge of the diaphragm and a location in an interior of the diaphragm.

11. The micromachined pressure sensor of claim 5 further comprising a diaphragm recess in a free surface of the SOI structure, the diaphragm recess located at a portion of the closing structure and material of the SOI structure at a bottom of the diaphragm recess forming the diaphragm.

12. The micromachined pressure sensor of claim 5 further comprising:
  an evacuation channel recess extending from the cavity recess and being shallower than the cavity recess; and
  a closed evacuation hole extending from a free surface of the SOI structure to the evacuation channel recess.

13. The micromachined pressure sensor of claim 12 wherein the evacuation channel recess is in the upper surface of the first silicon substrate.

14. The micromachined pressure sensor of claim 12 further comprising a closing layer including a layer of silicon oxide and a layer of silicon nitride, the closing layer closing the evacuation hole.

15. The micromachined pressure sensor of claim 13 wherein the sensor path is part of an electrically conducting silicon layer.

16. The micromachined pressure sensor of claim 15 wherein the conducting silicon layer is an ion implanted polysilicon layer.

17. The micromachined pressure sensor of claim 5 wherein the sensor path has a loop configuration and ends of the loop are located at the same side of the reference cavity or of the diaphragm.

18. The micromachined pressure sensor of claim 17 wherein the loop configuration is over only less than an entirety of a region located at a side of the reference cavity.

19. The micromachined pressure sensor of claim 5 wherein the SOI structure comprises inner and outer monocrystalline silicon layers, a portion of the outer monocrystalline silicon layer forming the diaphragm and a portion of the inner monocrystalline silicon layer forming the sensor path, the inner and outer monocrystalline silicon layers separated by an intermediate silicon oxide layer.

20. The micromachined pressure sensor of claim 5 wherein the SOI structure includes first and second SOI substructures.

21. The micromachined pressure sensor of claim 5 wherein active portions of the sensor path are supported by only a monocrystalline silicon layer.

22. A micromachined pressure sensor including:
  a first silicon substrate having a cavity recess in an upper surface of the first silicon substrate;
  a silicon-on-insulator (SOI) structure including a silicon layer and bonded to the first silicon substrate, the S01 structure forming a closing structure that closes the cavity recess and thereby forms a reference chamber, a portion of the closing structure covering the cavity recess forming a diaphragm;
  a sensor path arranged at the diaphragm and electrically connected to sense movements of the diaphragm;
  an evacuation channel recess extending from the cavity recess and being shallower than the cavity recess; and
  a closed evacuation hole extending from a free surface of the SOI structure to the evacuation channel recess.

23. The micromachined pressure sensor of claim 22 wherein the evacuation channel recess is in the upper surface of the first silicon substrate.

24. The micromachined pressure sensor of claim 22 further comprising a closing layer including a layer of silicon oxide and a layer of silicon nitride, the closing layer closing the evacuation hole.

* * * * *